DATA TRANSMISSION AND RESOLVING SYSTEM

Filed June 6, 1960 2 Sheets-Sheet 1

INVENTORS
PAUL G. HANSEL
HERBERT H. WALLER
BY
Mitchell & Bechert
ATTORNEYS

INVENTORS
PAUL G. HANSEL
HERBERT H. WALLER
BY
Mitchell & Bechert
ATTORNEYS

United States Patent Office 3,177,478
Patented Apr. 6, 1965

3,177,478
DATA TRANSMISSION AND RESOLVING SYSTEM
Paul G. Hansel, Greenvale, and Herbert H. Waller, Hicksville, N.Y., assignors to Servo Corporation of America, Hicksville, N.Y., a corporation of New York
Filed June 6, 1960, Ser. No. 34,262
6 Claims. (Cl. 340—209)

This invention relates to data transmission and resolving systems and more particularly to systems which transmit position or bearing data to a remote point and there resolve the data into analog voltages.

According to the latest Federal Aviation Agency statistics, there are thirty-five thousand miles of federal airways in use over the United States. This mileage is increasing constantly and very rapidly.

Due to this tremendous air mileage, it is extremely important to know the position of every aircraft at all times during flight, and it is equally important to have this information in a form which is useful for computation and plotting.

It is, accordingly, a principal object of this invention to provide a data transmission and resolving system which provides rapid, accurate and useful bearing data.

Another object of this invention is to provide an electronic circuit for resolving the bearing data into electrical signals having a predetermined relationship with bearing angle.

Briefly, the system of the present invention is comprised of three components. The first is a transmitter which modulates the amplitude of a carrier signal in accordance with both the bearing data and a reference pulse and transmits the resulting signal over either telephone lines or a radio link.

A receiver located at a remote point is the second component in the system. The receiver separates the data and reference information from the carrier and presents it to a third component, which may be, for example, a visual display device, a data resolver, or other means. If a data resolver is utilized, it converts the data and reference signals into analog voltages representing a desired relationship with the bearing angle such as the sine and cosine.

Further objects and features of this invention will become apparent to those skilled in the art from a study of the detailed description of the invention which follows. Illustrating the various components of the invention and referred to in the description are the accompanying drawings, in which.

Figure 1:
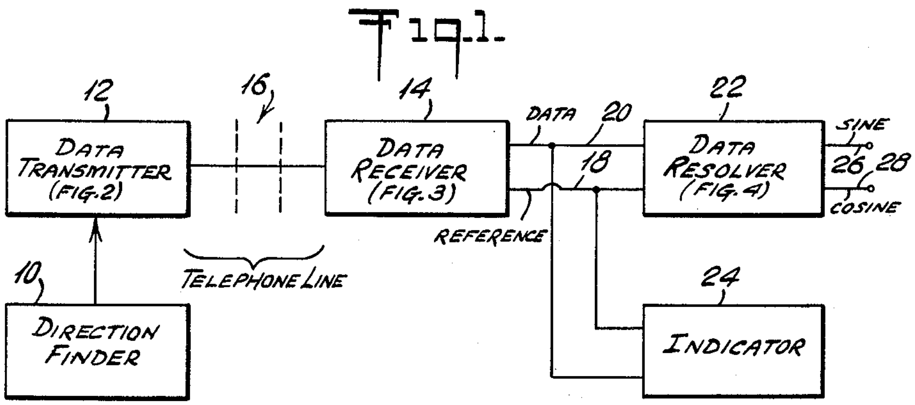
FIG. 1 is a block diagram of an overall bearing data transmission and resolving system in accordance with the invention.

The complete system for transmitting and resolving bearing data is shown in FIG. 1. The direction finder 10 will develop electrical signals which represent the position or bearing of an object such as, for example, a ship or an aircraft. The resulting signals are fed to a transmitter 12, the output of which is an A-M (amplitude modulated) signal containing both the bearing data and a reference pulse.

Then the A-M signal is transmitted to a receiver 14 by suitable means such as telephone lines, illustrated schematically in FIG. 1 by the numeral 16, or by radio, not shown. The receiver 14 separates the data and reference signals from the modulated carrier and feeds them via the leads 18 and 20 to a data resolver 22 and to a suitable indicator 24.

In the resolver 22, the data and reference signals are transformed into normalized D.-C. voltages proportional to the sine and cosine of the bearing angle. These D.-C. voltages then form the analog input for a computer (not shown) which correlates the outputs of a plurality of such systems, the terminals 26 and 28 being provided for the connection of such a computer.

The indicator 24 may be any suitable display device such, for example, as a standard cathode-ray visual bearing indicator.

Transmission of the bearing or position data is accomplished by amplitude modulating a 200 c.p.s. (cycles per second) variable phase data signal on a 2400 c.p.s. carrier. The sidebands of 2200 and 2600 c.p.s. do not experience an appreciably different phase shift from that experienced by the 2400 c.p.s. carrier so that the data will remain stable in spite of severe variations in the transmission medium.

The 2400 c.p.s. carrier is used to represent a reference signal also. Transmission of the reference in this form rather than in the form of a 200 cycle signal introduces an indeterminacy of phase mounting to an integral number of 30° steps. Resolution of this indeterminacy of the reference at the remote location is accomplished by transmitting a non-ambiguous reference pulse, which pulse is transmitted both for initial set-up purposes and as a calibrating feature whenever data signals are not being received.

Figure 2:
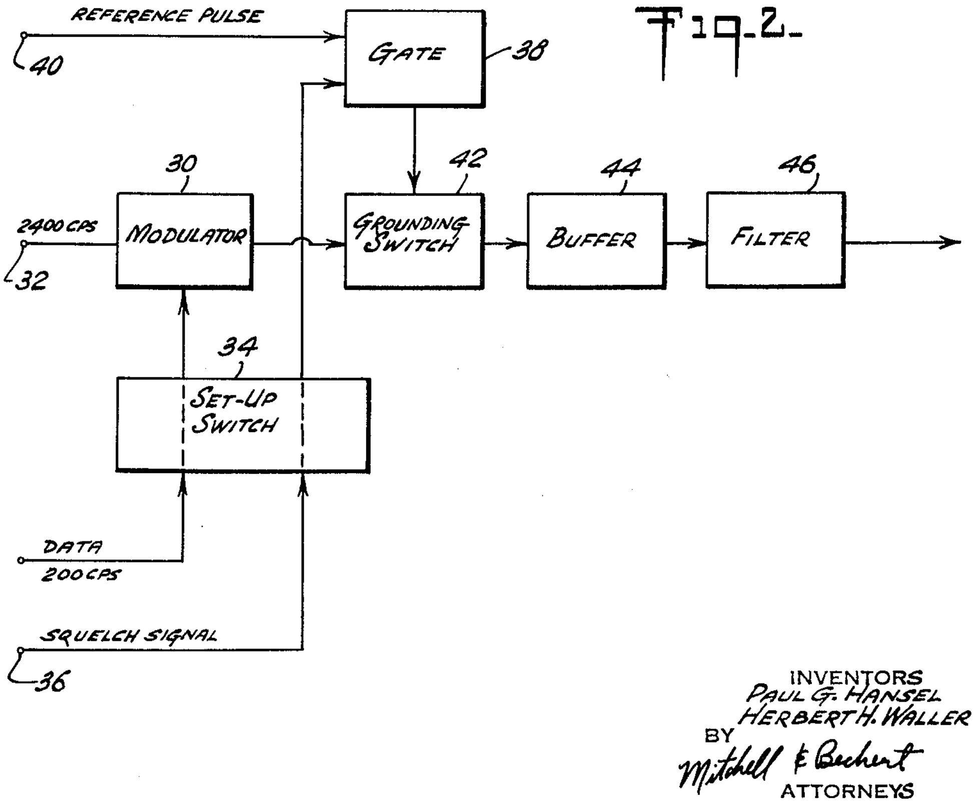
FIG. 2 is a block diagram of a transmitter used in the overall system shown in FIG. 1.

A circuit to accomplish this form of amplitude-modulated carrier is illustrated diagrammatically in simplified block form in FIG. 2. A 2400 c.p.s. square wave signal to be used as the carrier is available at the terminal 32 of the modulator 30, and the 200 c.p.s. data signal is applied to the modulator 30 through a "set-up" switch 34.

The "set-up" switch 34 is any suitable trigger circuit, as for example, a single-shot multivibrator. Therefore, when a data signal is delivered from the direction finder, the set-up switch 34 permits the signal to pass through to the modulator 30 and from there to modulate the carrier.

When the direction finder is producing no data signal, this condition is sensed by a suitable squelch circuit (not shown) incorporated in the finder, and the squelch circuit sends a signal through the terminal 36 (FIG. 2) to the "set-up" switch 34. Upon receipt of this squelch or no-data signal, the switch 34 sends an enabling voltage signal to the gate circuit 38, which permits a reference pulse to pass from a terminal 40 to a grounding switch 42.

The grounding switch 42 preferably is another modulator which impresses a reference pulse upon the carrier 200 times a second. The reason for this is to resolve the phase indeterminacy created by using the 2400 c.p.s. signal as a reference.

The "set-up" switch 34 permits this latter modulation to take place, even though a subsequent data signal is received in the interim, by disconnecting the source of the data signal from the first modulator 30 for a given period. The output of the switch 42 modulated either by the data signal or the reference pulse, is passed through a buffer amplifier 44 to achieve impedance equalization.

The filter circuit 46 is connected to the output of the buffer amplifier 44 and serves to remove the harmonic content of the carrier. The output of the filter circuit 46 is the output of the transmitter 12 (FIG. 1), and this output is fed either to standard voice frequency telephone lines or to a suitable transmitting antenna for transmission to a receiver 14 (FIG. 1) located at a remote plotting or computing center.

Figure 3:
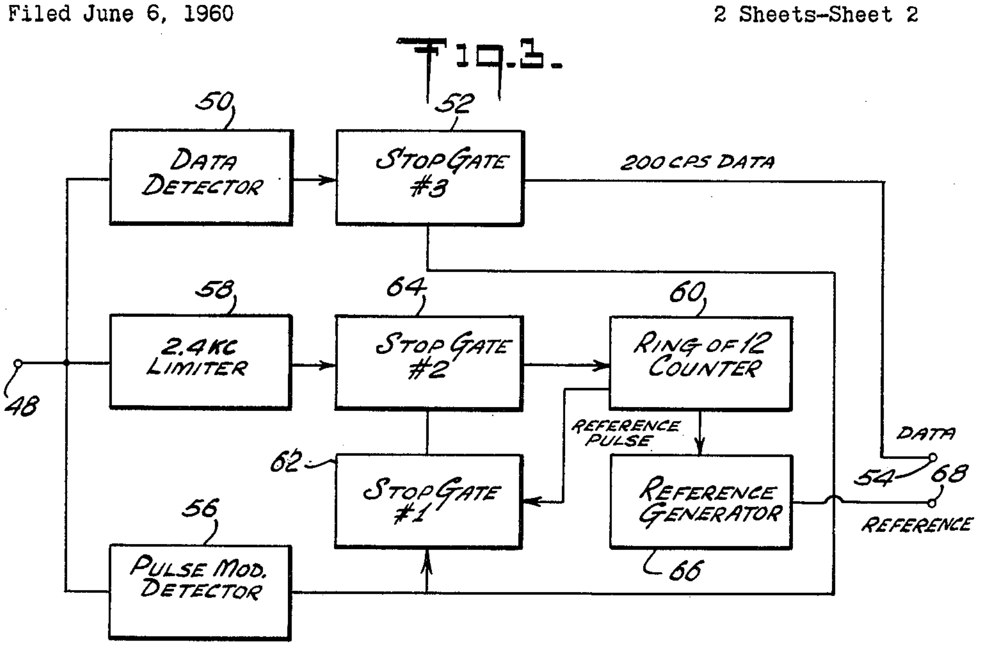
FIG. 3 is a block diagram of a receiver used in conjunction with the system of FIG. 1.

The data receiver located at the remote point is illustrated in greater detail in FIG. 3. The received signal is fed simultaneously through the terminal 48 to three parallel circuits.

In the first parallel circuit, a data detector 50 extracts the 200 c.p.s. data signal (if one is present) and feeds it through a stop gate 52 directly to an output terminal 54. In the absence of a data signal, however, the detector 50 will detect the modulated reference pulse, and it is necessary to prevent a detected reference pulse from being fed out as a data pulse at the terminal 54.

Therefore, a second parallel circuit contains a pulse modulation detector 56, the output of which will close the gate 52 thus preventing the reference pulses detected by the data detector 50 from appearing at the output terminal 54 as data signals.

To obtain a reference signal of the same low frequency as that of the data signal, the signal received at terminal 48 is fed simultaneously to a third parallel circuit containing a 2.4 kc. limiter identified in FIG. 3 by the numeral 58. The limiter 58 removes all modulation from the received signal before passing it on to a "ring of twelve" counter identified by the numeral 60.

Since the carrier signal is at a frequency of twelve times that of the data signal (2400 compared with 200), the ring of twelve counter 60 will actuate a reference generator 66 at the proper times to obtain a reference signal of 200 c.p.s. at the output terminal 68. The synchronization of the ring counter 60 is accomplished in a manner now to be described.

Whenever a pulse detected by the pulse modulation detector 56 is not time coincident with the reference pulse from the ring counter 60, stop gate 62 will not actuate stop gate 64 which will then act to block one of the pulses from the limiter 58, thus stepping the counter backwards. This operation continues until stop gate 62 prevents further interference with the ring counter 60. This will occur as soon as a reference pulse emitted by the ring counter 60 is coincident with a pulse received from pulse modulation detector 56.

The circuits just described will continue to monitor the operation of the ring counter 60 to prevent momentary line failures from permanently upsetting the operation of the unit. At the proper times, however, the ring counter 60 will actuate the reference generator 66 to provide a reference signal of 200 c.p.s. at the output terminal 68. Both the data and reference signals are then fed to a suitable utilization circuit such as either a visual display device or a data resolver.

Figure 4:
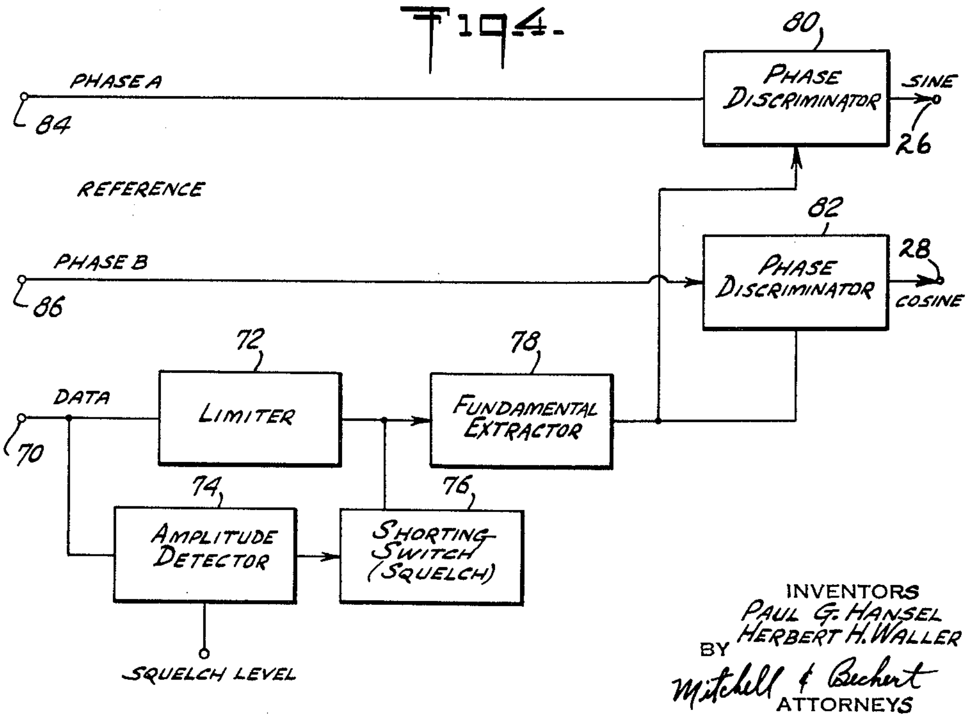
FIG. 4 is a block diagram of the data resolver which transforms a data signal into analog voltages.

FIG. 4 illustrates a circuit to transform the data and reference signals of the receiver 14 to analogs of the sine and cosine of the bearing angle. The data signal taken through the terminal 70 is fed simultaneously to a limiter circuit 72 and an amplitude detector 74. The object of these circuits is to remove from the data signal amplitude variations due to elevation angle or threshold signal, in other words, to normalize the amplitudes of the data signal. This normalization is accomplished primarily by the limiter circuit 72 which is designed so that its output undergoes only negligible phase and amplitude variation with normally expected variation in input level.

It is necessary also to use a squelch circuit 76 to limit noise.

The fundamental can be extracted from the output of the limiter 72 by a filter circuit 78 which is designed to protect against phase shift. The normalized data signal so obtained is fed then to phase discriminators 80 and 82.

These two phase discriminators 80 and 82 are driven in electrical quadrature; that is, separated in time by 90°. This is achieved by feeding to the phase discriminator 80 a phase A reference signal through the terminal 84 and feeding a quadrature reference pulse to the discriminator 82 through the terminal 86. Since the sine and cosine are also in quadrature reference to each other, the D.C. outputs of the discriminators 80 and 82 will represent respectively the sine and cosine of the bearing angle.

It is thought that the invention and its numerous attendant advantages will be fully understood from the foregoing description, and it is obvious that numerous modifications in addition to those already disclosed, may be made in the form, construction and arrangement of the several parts without departing from the spirit or scope of the invention or sacrificing any of its attendant advantages, the forms herein being preferred embodiments for the purpose of illustrating the invention.

Having thus fully described the invention, what is claimed as new and desired to be secured by Letters Patent of the United States is:

1. A data transmission and resolving system comprising means to develop electrical data signals representative of the position of an object, means for transmitting said electrical data signals with a reference pulse in the form of an amplitude modulated carrier, said transmitting means including a first modulator for modulating said carrier in accordance with said data signals and a second modulator for modulating said carrier in accordance with said reference pulse, said transmitting means further controlling said first modulator to allow operation thereof only in the presence of said data signal and means for controlling said second modulator to allow operation thereof only in the absence of said data signal, receiving means for separating said electrical data signal from said reference signal, and means for resolving said data signal into analogs having a predetermined relationship with the position of said object.

2. A data transmission and resolving system as set forth in claim 1 wherein the transmitting means further including means to filter the harmonic content from said modulated carrier.

3. A data transmission and resolving system as set forth in claim 1 wherein the receiving means comprises a first detector to detect both the data signal and the reference pulse, a second detector to detect only the reference pulses, a limiting circuit for obtaining a modulation-free carrier signal, a gating circuit connected to both said first and said second detectors for allowing only the data signal to pass, a scaling circuit connected to said limiting circuit, the ratio of said scaling circuit being equal to the ratio of the frequencies of the carrier and the data signal, means for synchronizing said scaling circuit with said second detector, and generating means connected to said scaling circuit to provide a reference signal of the same frequency as that of the data signal.

4. A data transmission and resolving system as set forth in claim 1 wherein the resolving means comprises a first phase discriminator, a second phase discriminator, means to limit the amplitude of the data signal, means to filter the data signal, means to apply said data signal to said first phase discriminator and simultaneously to said second phase discriminator and means to operate said first and second phase discriminator in electrical quadrature.

5. A data transmission system comprising input means for receiving electrical data signals, a carrier signal generator for producing a carrier signal output, a modulator coupled between said input means and said carrier signal generator for modulating said carrier signal output in accordance with said electrical data signals, reference signal means coupled to said modulator for modulating said carrier signal in accordance with a reference signal, receiver means for receiving said modulated carrier signal to separate the data signal modulation thereon from the reference signal modulation thereon, and data resolving means for developing output signals, said resolving means including first and second phase discriminators coupled to receive said reference signal information from said receiver means, said resolving means further including means coupled to receive said data information to normalize the amplitude thereof and deliver the same to each of said phase discriminators, whereby D.C. output signal components of said data signals are developed at the output terminals of each of said phase discriminators.

6. The combination defined in claim 5 wherein said modulator contains a first modulating means and a second modulating means, said first modulating means being coupled to said input means and said second modulating means being coupled to said reference signal means, and also including modulator control means coupled to said input means and to said modulator, said modulator control means actuating said first modulating means only in the presence of said data signals and actuating said second modulating means only in the absence of said data signals.

References Cited in the file of this patent

UNITED STATES PATENTS

| | | |
|---|---|---|
| 2,579,831 | Keinath | Dec. 25, 1951 |
| 2,719,284 | Roberts | Sept. 27, 1955 |
| 2,730,696 | Davis | Jan. 10, 1956 |
| 2,736,007 | Kenyon | Feb. 21, 1956 |
| 2,970,302 | Gridley | Jan. 31, 1961 |